US008620946B2

(12) United States Patent
Dumant

(10) Patent No.: US 8,620,946 B2
(45) Date of Patent: Dec. 31, 2013

(54) STORAGE AND SEARCHING OF TEMPORAL ENTITY INFORMATION

(75) Inventor: Bruno Dumant, Verneuil sur Seine (FR)

(73) Assignee: SAP AG, Walldorf (DE)

( * ) Notice: Subject to any disclaimer, the term of this patent is extended or adjusted under 35 U.S.C. 154(b) by 149 days.

(21) Appl. No.: 12/970,001

(22) Filed: Dec. 16, 2010

(65) Prior Publication Data

US 2012/0158714 A1 Jun. 21, 2012

(51) Int. Cl.
  *G06F 7/00* (2006.01)
  *G06F 17/30* (2006.01)
(52) U.S. Cl.
  USPC .......................................... 707/769; 707/745
(58) Field of Classification Search
  USPC ................... 707/725, 728, 745, 746
  See application file for complete search history.

(56) References Cited

U.S. PATENT DOCUMENTS

| | | | | |
|---|---|---|---|---|
| 7,849,185 | B1 * | 12/2010 | Rockwood | 709/224 |
| 7,873,637 | B2 * | 1/2011 | Kobayashi et al. | 707/736 |
| 7,970,742 | B2 * | 6/2011 | Hanckel et al. | 707/673 |
| 8,131,705 | B2 * | 3/2012 | Chevalier et al. | 707/706 |
| 8,145,643 | B2 * | 3/2012 | Maghoul et al. | 707/746 |
| 8,290,921 | B2 * | 10/2012 | Liu et al. | 707/705 |
| 2002/0093522 | A1 * | 7/2002 | Koskas | 345/700 |
| 2004/0215708 | A1 * | 10/2004 | Higashi et al. | 709/201 |
| 2006/0004686 | A1 * | 1/2006 | Molnar et al. | 707/1 |
| 2007/0112835 | A1 * | 5/2007 | McMullen et al. | 707/102 |
| 2007/0130171 | A1 * | 6/2007 | Hanckel et al. | 707/100 |
| 2008/0162777 | A1 * | 7/2008 | Kaiser et al. | 711/100 |
| 2009/0144244 | A1 * | 6/2009 | Maghoul et al. | 707/3 |
| 2009/0182779 | A1 * | 7/2009 | Johnson | 707/200 |
| 2009/0248717 | A1 * | 10/2009 | Hughes | 707/100 |
| 2010/0057706 | A1 * | 3/2010 | Zhou | 707/4 |
| 2010/0082705 | A1 * | 4/2010 | Ramesh et al. | 707/808 |
| 2010/0235366 | A1 * | 9/2010 | Andrew et al. | 707/752 |
| 2011/0320419 | A1 * | 12/2011 | Johnston et al. | 707/703 |
| 2012/0143875 | A1 * | 6/2012 | Sarma et al. | 707/746 |
| 2012/0174024 | A1 * | 7/2012 | Safoutin | 715/781 |

OTHER PUBLICATIONS

Steiner, "A Generalisation Approach to Temporal Data Models and their Implementations", 1998, Swiss Federal Institute of Technology Zurich, pp. 1-146.*

* cited by examiner

*Primary Examiner* — Wilson Lee
*Assistant Examiner* — Jessica N Le
(74) *Attorney, Agent, or Firm* — Buckley, Maschoff & Talwalker LLC

(57) ABSTRACT

A system may include determination of a plurality of data structures associated with an entity, each of the plurality of data structures associated with a respective validity period, determination of a plurality of non-overlapping time periods based on the validity periods, the plurality of non-overlapping time periods collectively spanning all of the validity periods, determination, for each of the plurality of non-overlapping time periods, of a composite data structure based on each of the data structures associated with a validity period including the non-overlapping time period, assignment of a respective document identifier to each composite data structure, each document identifier indicating the entity, and indexing of the composite data structures within an index.

15 Claims, 9 Drawing Sheets

200 ⟶

| Entities | | | | |
|---|---|---|---|---|
| Entity_id | Provider | ••• | Start Date | End Date |
| A | 1 | ••• | 6/1/10 | 10/1/10 |
| A | 1 | ••• | 10/2/10 | MAX |
| A | 2 | ••• | 8/1/10 | MAX |
| B | 3 | ••• | 6/15/10 | 8/15/10 |
| C | 1 | ••• | 6/1/10 | 10/1/10 |
| C | 3 | ••• | 6/15/10 | MAX |
| C | 1 | ••• | 10/2/10 | MAX |

| Relations | | | | | |
|---|---|---|---|---|---|
| Source | Target | Type | Provider | Start Date | End Date |
| A | C | Employee | 1 | 6/1/10 | 10/1/10 |

| Start Date Index | |
|---|---|
| Start Date | Document IDs |
| 6/1/10 | DA1, DC1 |
| 6/15/10 | DB1 |
| 8/1/10 | DA2 |
| 10/2/10 | DC2, DA3 |

| End Date Index | |
|---|---|
| End Date | Document IDs |
| 8/15/10 | DB1 |
| 10/1/10 | DA2, DC2 |
| MAX | DA3, DC3 |

FIG. 10

STORAGE AND SEARCHING OF TEMPORAL ENTITY INFORMATION

BACKGROUND

Modern organizations store electronic information associated with one or more entities, such as people, organizations, or the like. For example, different systems within an enterprise may store data representing personal contact information, management structures, electronic mail communications, project assignments, etc. This data may also suggest different types of relationships (e.g., manager-managee, same project, same location, etc.) between people within the enterprise.

Commonly-assigned co-pending U.S. patent application Ser. No. 12/253,562 describes systems to populate a social network based on disparate enterprise source data in order to expose various relationships between entities. Commonly-assigned co-pending U.S. patent application Ser. No. 12/253,518 describes a system to search for entities within such a social network.

Conventional systems operate based on the most-recently available data. That is, stored data related to entities is simply overwritten when new information becomes available. The determination of entity relationships proceeds based on this most-recent data. Accordingly, searching for entities and/or relationships generates search results which reflect the present point in time.

Systems are desired for maintaining past information regarding entities and relationships, while also supporting newly-received information. Such systems may provide searching based on information date, and/or may manage data obsolesence. Desired systems may also facilitate the foregoing functionality in a environment including multiple information providers.

BRIEF DESCRIPTION OF THE DRAWINGS

FIG. 2 is a tabular representation of a portion of a data structure according to some embodiments.

FIG. 3 is a tabular representation of a portion of a data structure according to some embodiments.

FIG. 9 is a tabular representation of a portion of an index according to some embodiments.

FIG. 10 is a tabular representation of a portion of an index according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
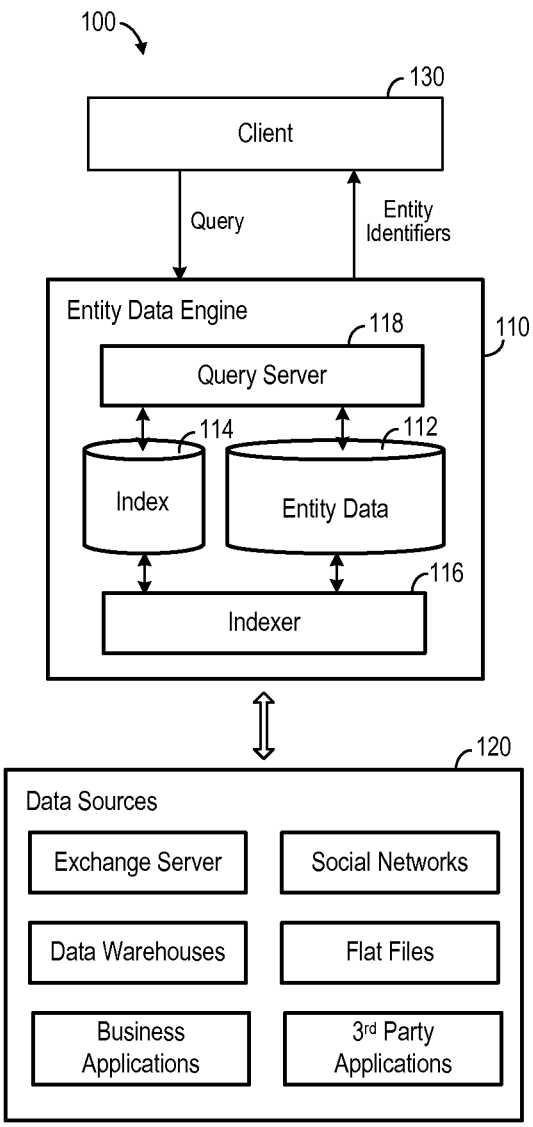
FIG. 1 is a block diagram of a system according to some embodiments.

FIG. 1 is a block diagram of environment 100. Environment 100 represents a logical architecture for describing some embodiments, and actual implementations may include more or different components arranged in any manner. Environment 100 may be implemented using any number of computing devices, and one or more processors within environment 100 may execute program code to cause corresponding computing devices to perform processes described herein. For example, environment 100 may be implemented by a single computing device.

Generally, each logical component described herein may be implemented by any number of devices coupled via any number of public and/or private networks. Two or more of such devices may be located remote from one another and may communicate with one another via any known manner of network(s) and/or via a dedicated connection. Moreover, each logical component may comprise any number of hardware and/or software elements suitable to provide the functions described herein as well as any other functions.

Entity data engine 110 may comprise any one or more processor-based computing and/or storage devices including entity data 112, index 114, indexer 116 and query server 118. Entity data 112 may comprise a data structure includes a plurality of entities, with each of the plurality of entities being associated with a respective identifier and a respective one or more attribute values. According to some embodiments, entity data 112 also includes data associating each of the plurality of entities with one or more relations to one or more other ones of the plurality of entities.

An entity may comprise a person, a company, a location, or any other subject which may be associated with a name and attributes. The entities, names, attributes, and relations of entity data 112 may be represented within entity data 112 using any suitable data structure. For example, a data structure representing an entity of entity data 112 may comprise a database record including the entity's name and attributes. In some embodiments, each data structure of entity data 112 corresponds to one entity and one data provider, such that each data structure includes data (e.g., a name and attributes) associated with an entity and received from a single data provider. As will be described below, each data structure may also be associated with a validity period (e.g., a start date and an end date).

Data sources 120 provide data to entity data engine 110 for storage within entity data 112. Embodiments are not limited to the sources illustrated within data sources 120. The data may be provided to entity data 112, processed, and stored within entity data 112 in any suitable manner.

The entities, names, attributes, and relations of entity data 112 may be received from any types of data sources and in any manner or format. Non-exhaustive examples of such data sources include enterprise applications (e.g., SAP CRM, SalesForce.com), social networks (e.g., Facebook, LinkedIn), groupware data (e.g., Microsoft Outlook files), and any other suitable data store and/or feed. In this regard, entity data 112 may store data provided by heterogeneous sources in multiple formats at various intervals.

The relations associated with the entities of entity data 112 may be provided by their respective data sources and/or may be determined based on the data of entity data 112. Embodiments are not limited to any types of relations or to any particular system for determining relations among entities.

Entity data 112 may be associated with a particular user or group of users. For example, within an enterprise, a first user may be associated with a first set of entity data records and a second user may be associated with a second set of entity data records. The first set and the second set may include some common entities, attribute values and/or relations (e.g., received from a CRM system of the enterprise), but may also include different entities, attribute values and/or relations (e.g., received from the first user's and second user's respective social networking accounts).

Indexer 116 may operate to index entity data 112 into index 114 as described herein. According to some embodiments, two or more composite records are created for a single entity based on records for the entity stored in entity data 112 and based on validity periods of the stored records. Each composite record is assigned a document identifier and the composite records are indexed according to their document identifiers. Detailed examples of such an operation according to some embodiments are described below.

Query server 118 may receive a query from client 130, which may comprise any suitable client device (e.g., desktop computer, smartphone, laptop computer, tablet computer, etc.) executing any suitable application (Web Browser, dedicated client application, groupware plug-in, etc.). Query server 118 executes the query against index 114 to retrieve one or more document identifiers as is known. Each retrieved document identifier may be associated with a relevance score as is also known. The document identifiers are resolved into corresponding entity identifiers and the entity identifiers are returned to client 130.

FIGS. 2 and 3 present tabular representations of portions of entity data 112 according to some embodiments. The representations include Entities table 200 and Relations table 300. Embodiments may store the information of tables 200 and 300 in more than two tables or less than two tables. Embodiments are also not limited to database tables.

Each record of Entity table 200 includes attribute values for a given entity. The values specify an Entity_id, Provider, Start Date, End Date, and any other suitable attributes that are or become known (e.g., Name, Location, etc.). Some attributes may be applicable to some entities but not to others, depending on the entity type. For example, a person may be associated with a value of a Height attribute, while a company may be associated with a value of a Country of Incorporation attribute.

The Provider attribute value of a particular record indicates the source of the data located in the record. Accordingly, it is noted that Entity A includes a record associated with Provider 1 and a record associated with Provider 2. The Start Date and End Date values of a record indicate the validity period of the data of the record. The validity periods of records which associated with a same entity but with different providers may overlap.

Each record of Relations table 300 associates an entity (identified by a value of the Source_id field) with another entity (identified by a value of the Target_id field). Relations table 300 of FIG. 3 also indicates a Type of each relation, though embodiments are not limited thereto. Each record of Relations table 300 is also associated with a Provider attribute value and a validity period as described above with respect to Entities table 200. As mentioned above, the relations associated with the entities of entity data 112 may be provided by data sources which provide attribute values for the entities and/or may be determined entity data engine 110 based on the data stored therein.

Figure 4:
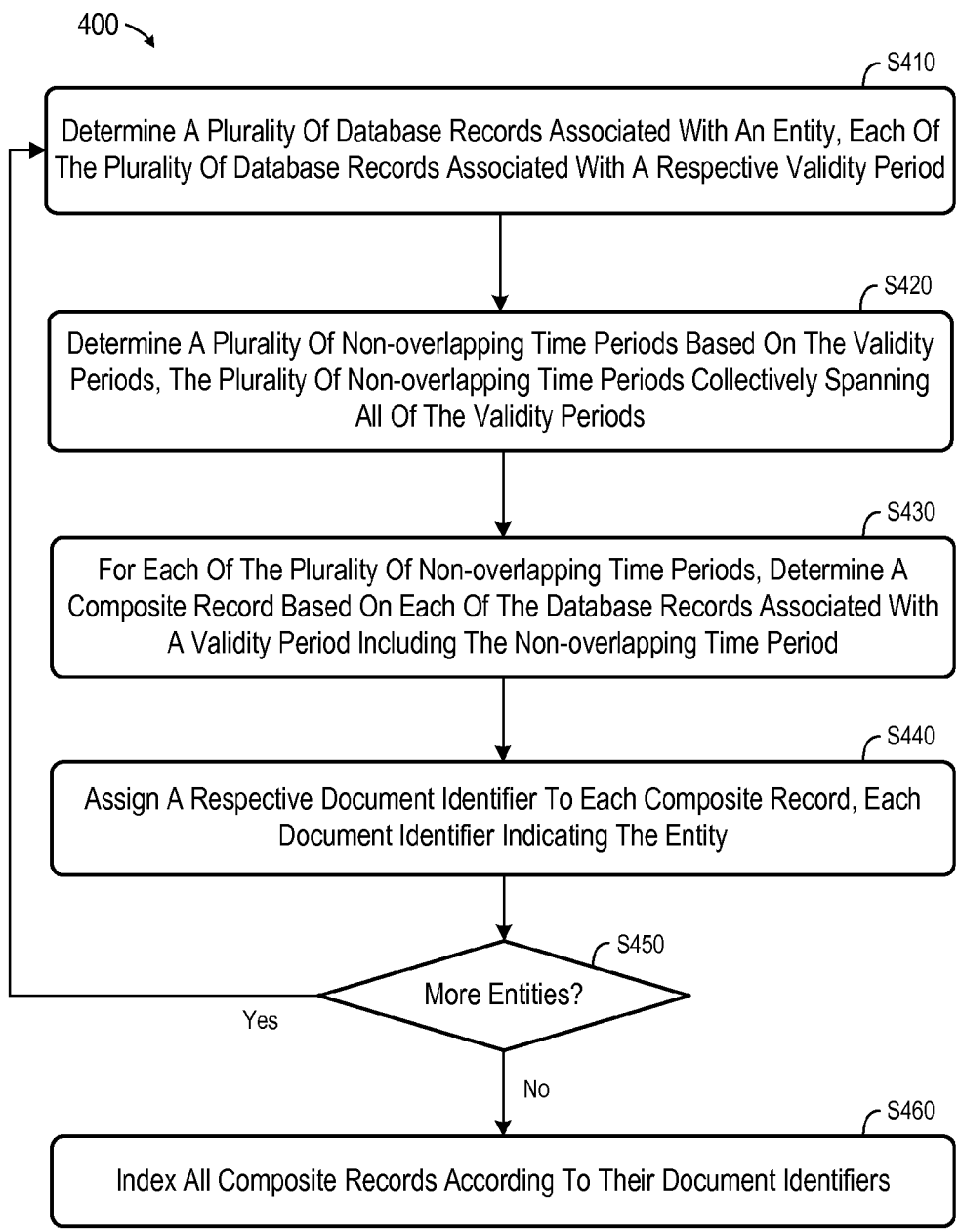
FIG. 4 is a flow diagram of a process according to some embodiments.

FIG. 4 is a flow diagram of process 400 according to some embodiments. Process 400, and all other processes described herein, may be executed by hardware and/or embodied in program code stored on a tangible computer-readable medium. Examples of process 400 will be described below with respect to indexer 116, but examples are not limited thereto.

Generally, process 400 is intended to create, for each entity, distinct records corresponding to distinct time periods. The distinct records are then indexed to support time-based entity searches.

Initially, at S410, a plurality of database records associated with an entity are determined. Although the present description refers to records, any unit of storage which provides association of attribute values may be used in some embodiments. Each of the plurality of database records is associated with a respective validity period. For purposes of example, it will be assumed that the three records of table 200 which are associated with Entity A are determined at S410.

Figure 5:
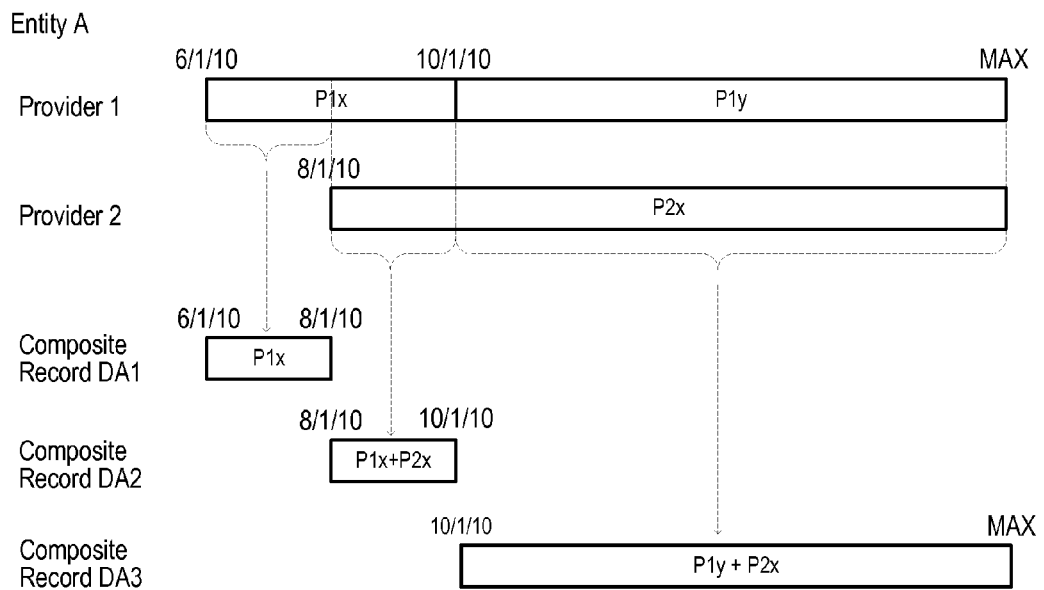
FIG. 5 illustrates the generation of composite records according to some embodiments.

A plurality of non-overlapping time periods are determined at S420 based on the validity periods of the determined plurality of database records. The plurality of non-overlapping time periods collectively span all of the validity periods. FIG. 5 is a diagram to illustrate S420 through S440 according to some embodiments.

FIG. 5 includes a bar graph illustrating the two records associated with Entity A and with Provider 1. The first record is identified as P1$x$ and is associated with a validity period from Jun. 1, 2010 to Oct. 1, 2010. The second record is identified as P2$x$ and is associated with a validity period from Oct. 2, 2010 to MAX. Also shown is a bar graph illustrating the one record associated with Entity A and with Provider 2. This record is identified as P2$x$ and is associated with a validity period from Aug. 1, 2010 to MAX.

At S420, a plurality of non-overlapping time periods are determined based on the validity periods of the database records determined at S410. More specifically, the plurality of non-overlapping time periods collectively span all of the validity periods of the database records determined at S410. Then, at S430, a composite record is determined for each of the plurality of non-overlapping time periods. The determination of a composite record for a non-overlapping time period is based on each of the database records associated with a validity period including the non-overlapping time period. A document identifier is assigned to each composite record at S440, and each composite identifier indicates the current entity.

According to the FIG. 5 example, non-overlapping time periods Jun. 1, 2010-Aug. 1, 2010, Aug. 1, 2010-Oct. 1, 2010 and Oct. 1, 2010-MAX are determined at S420. These time periods are chosen such that each period corresponds to a single combination of records P1$x$, P1$y$ and P2$x$. In this regard, a composite record is determined for each non-overlapping period at S430. The composite record for non-overlapping time period Jun. 1, 2010-Aug. 1, 2010 includes data from record P1$x$, the composite record for non-overlapping time period Aug. 1, 2010-Oct. 1, 2010 includes data from records P1$x$ and P2$x$, and the composite record for non-overlapping time period Oct. 1, 2010-MAX includes data from record P1$y$ and P2$x$. The three composite records are identified with document identifiers DA1, DA2 and DA3 so as to indicate Entity A.

Figure 6:
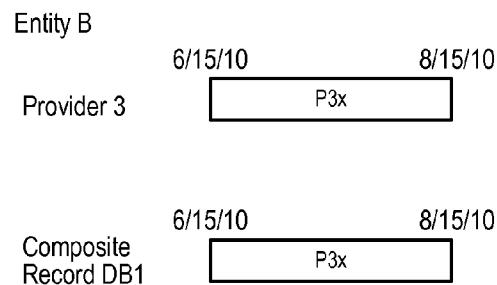
FIG. 6 illustrates the generation of composite records according to some embodiments.

Flow continues to S450 and returns to S410 if entity data 112 includes records associated with additional entities. For example, FIG. 6 illustrates execution of S410 through S440 with respect to the record of table 200 associated with Entity B. Only one validity period, one non-overlapping time period, and one composite record (i.e., which is identical to the database record) are determined with respect to Entity B.

Figure 7:
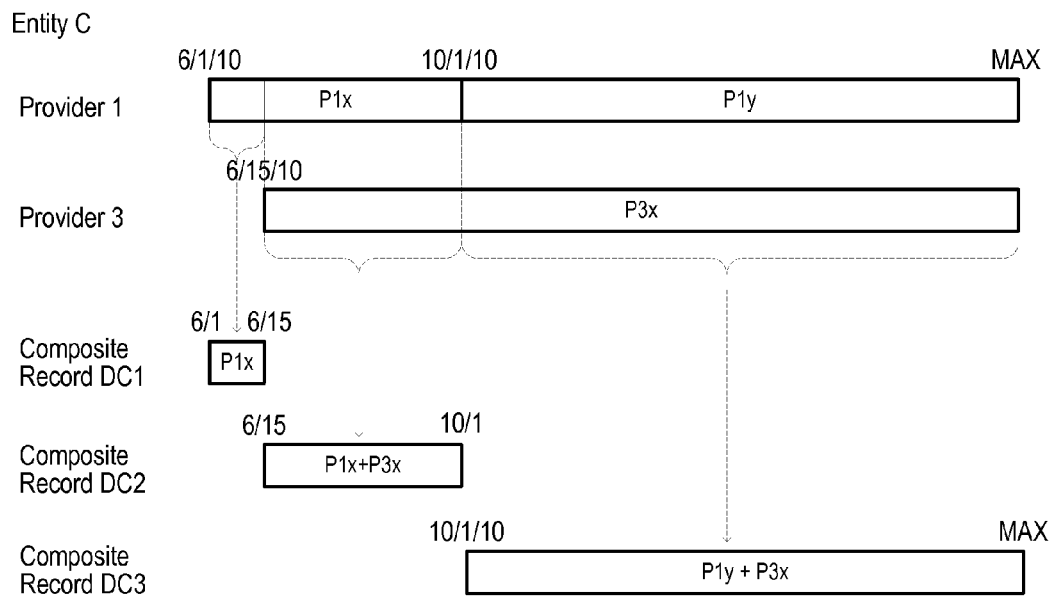
FIG. 7 illustrates the generation of composite records according to some embodiments.

Similarly, FIG. 7 illustrates execution of S410 through S440 with respect to the three records of table 200 associated with Entity C. FIG. 7 includes a bar graph illustrating the two records associated with Entity C and with Provider 1. The first record is identified as P1x and is associated with a validity period from Jun. 1, 2010 to Oct. 1, 2010. The second record is identified as P1y and is associated with a validity period from Oct. 2, 2010 to MAX. FIG. 7 also includes a bar graph illustrating the one record associated with Entity C and with Provider 3. This record is identified as P3x and is associated with a validity period from Jun. 15, 2010 to MAX.

Based on these records and validity periods, non-overlapping time periods Jun. 1, 2010-Jun. 15, 2010, Jun. 15, 2010-Oct. 1, 2010 and Oct. 1, 2010-MAX are determined at S420. The composite record for non-overlapping time period Jun. 1, 2010-Jun. 15, 2010 includes data from record P1x, the composite record for non-overlapping time period Jun. 15, 2010-Oct. 1, 2010 includes data from records P1x and P3x, and the composite record for non-overlapping time period Oct. 1, 2010-MAX includes data from record P1y and P3x. The three composite records are identified with document identifiers DC1, DC2 and DC3 so as to indicate Entity C.

Figure 8:
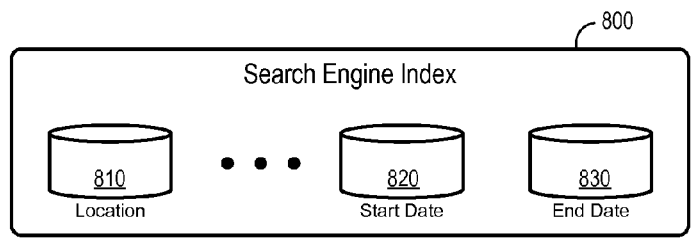
FIG. 8 is a block diagram of a search engine index according to some embodiments.

After all entities have been processed, flow proceeds to S460 to index all the composite records according to their document identifiers. Search engine index 800 of FIG. 8 shows indices 810, 820 and 830, and may include other indices corresponding to the attributes of entity table 200 and/or relations table 300. Each of indices 810, 820 and 830 is associated with a different field (i.e., location, start date, end date).

Any system for indexing that is or becomes known may be employed at S460. FIG. 9 shows Start Date Index 820 according to the present example. Index 820 is an inverted index in which the indexed data (i.e., the Start Dates) are the keys and the document identifiers of composite records which include the Start Dates are the values. Similarly, End Date Index 830 is an inverted index in which the End Dates of the composite records are the keys and the identifiers of documents (i.e., composite records) which include the End Dates are the values.

Index 114 of system 100 may comprise an implementation of search engine index 800. According to known systems, query server 118 may receive a search query from client 130 and may identify documents which are relevant to the search query. Client 130 or query server 118 may adapt a received search query for use by an index created according to process 400. For example, if a user creates the search query Q on date d, query server 118 may execute the query: Q AND start<=d AND end>=d. If index 114 does not contain information that is only valid in the future (i.e., start date >d), then the above query can be simplified to Q AND end=MAX.

Since any given entity is represented by at most one composite document for a given date, relevance scores for the returned document identifiers may be assigned to the entities indicated by the document identifiers, and the corresponding entity identifiers may be returned to client 130. In some embodiments, index 114 stores some identifying information of each entity (e.g., name, picture, etc.) and this identifying information is also returned for each entity identifier in the search results.

If the received search specifies a time period between start date s and end date e (e.g., Q AND start<=e AND end>=s), the search results may include more than one document identifier associated with a particular entity (e.g., DA1 and DA2). Accordingly, relevance scores for the entity may be computed based on the relevance scores associated with its corresponding returned document identifiers. The computation may comprise summing of the relevance scores, summing of relevance scores weighted according to the duration (e.g., in days) of the corresponding query match, etc.

Figure 11A:
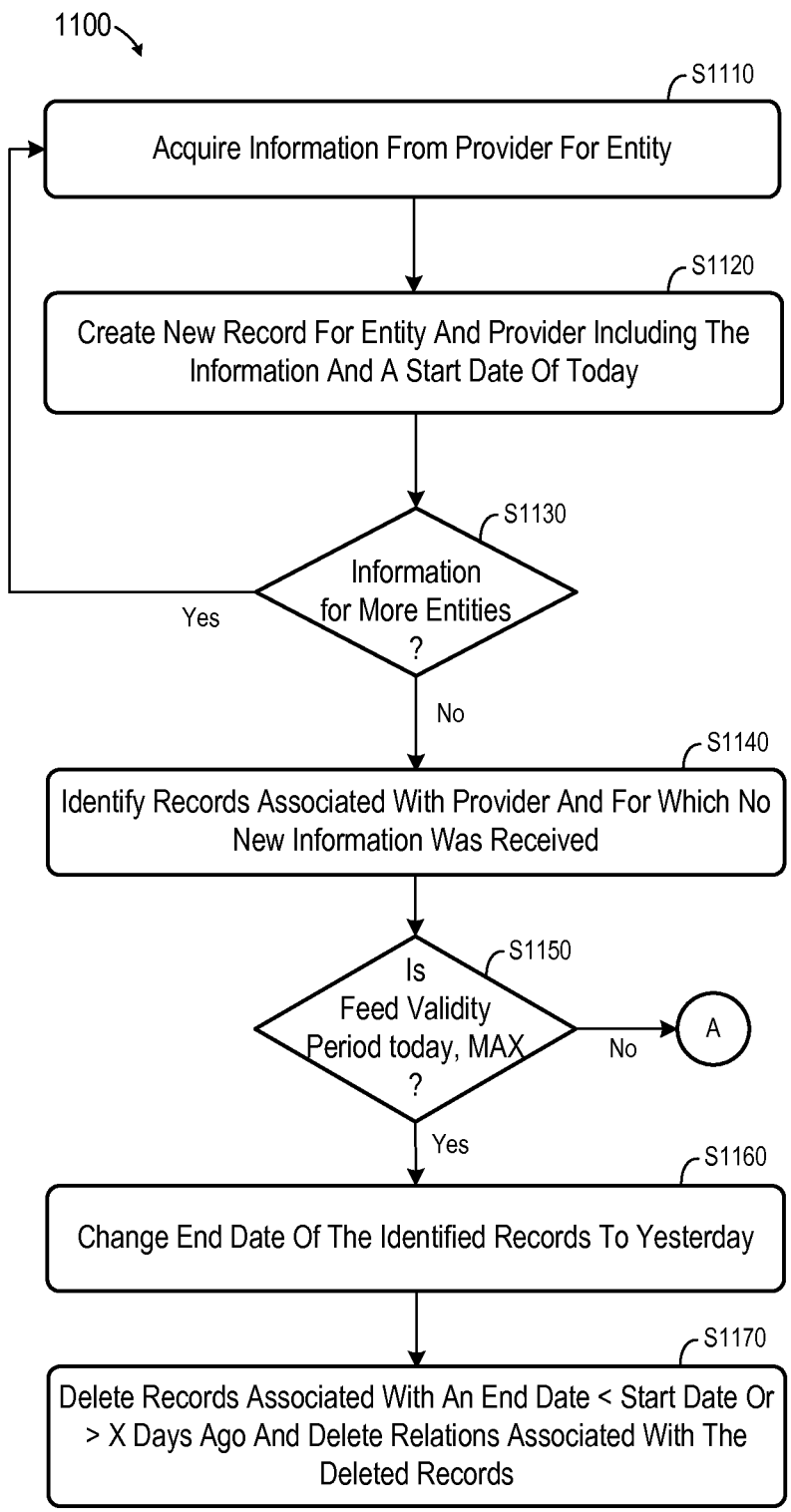
FIGS. 11A and 11B comprise a flow diagram of a process according to some embodiments.
Figure 11B:
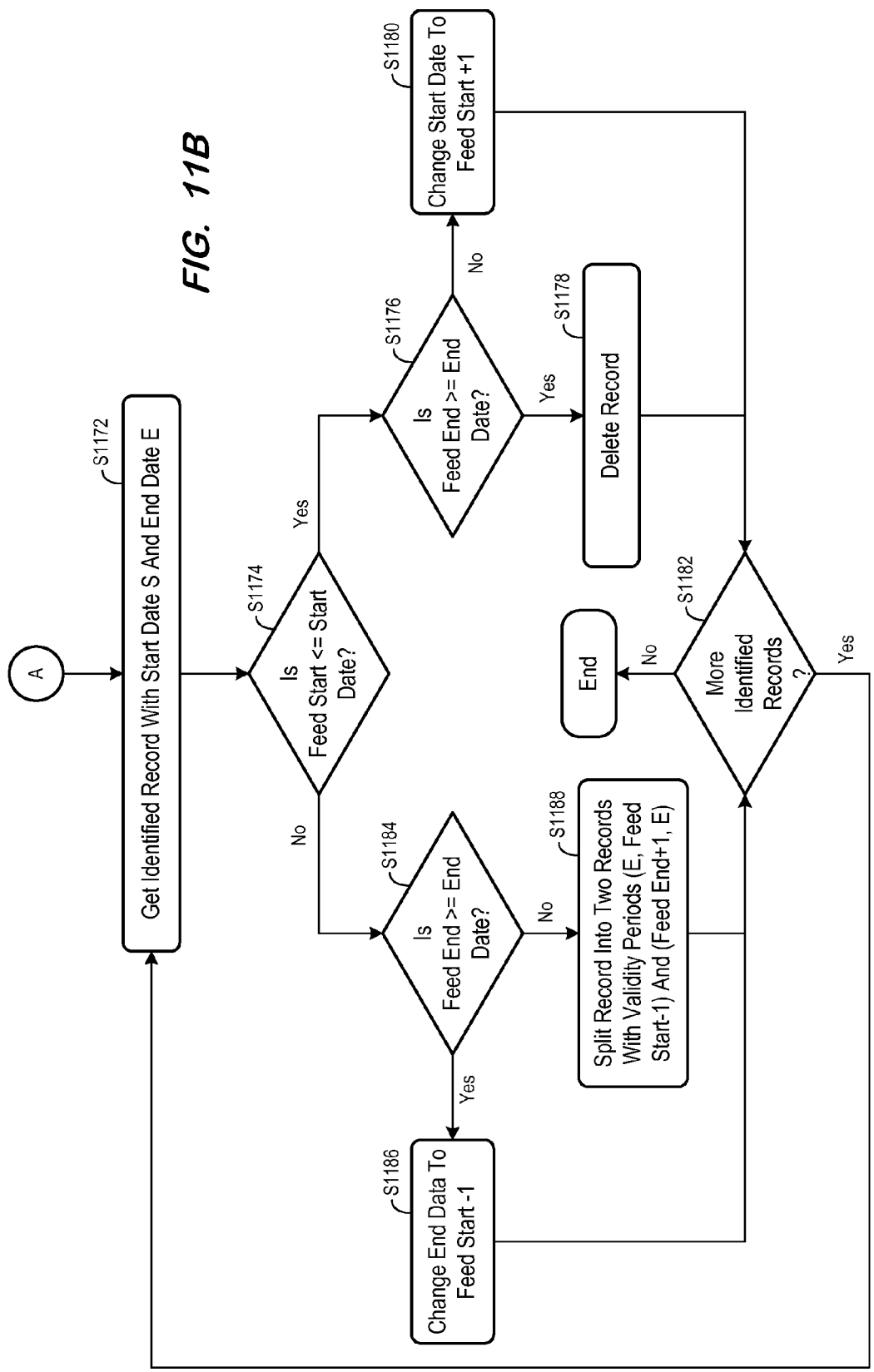

FIG. 11 is a flow diagram of process 1100 to feed information into entity data 112 according to some embodiments. Entity data engine 110 may comprise program code executable by a processor to perform process 1100.

Information for an entity is acquired from an information provider at S1110. The information may be acquired as a feed in response to a periodic or asynchronous request from engine 110, and/or may be pushed as a feed from one of data sources 120 periodically or asynchronously.

A new record is created for the entity and the provider within entity data 112 at S1120. The new record includes the new information, a start date and an end date. The start date and the end date may define a validity period associated with the feed. In some embodiments, the default start date and the end date are today and MAX, respectively. The start date and end date are not limited thereto, and may be provided by the information provider or determined by engine 110.

At S1130, it is determined whether the provider has information for more entities. If so, flow returns to S1110 to acquire the information and to S1120 to create a corresponding new record as described above. If not, the feed is considered "complete" and flow proceeds to S1140. An administrator may enter an instruction at S1130 indicating that the feed is complete.

Records which are associated with the present provider and for which no new information was received are identified at S1140. Then, at S1150, it is determined wither the start date and the end date of the identified records are today and MAX, respectively. If so, the end date of the identified records is changes to yesterday at S1160. Next, in order to remove obsolete records, S1170 includes deletion of records associated with an end date which is less than its start date, or associated with an end date which is greater than X (X=a predetermined number of days) days before the present day. Moreover, any relations of relations table 300 which are associated with these deleted records are also deleted. Process 1100 may be performed in conjunction with any number of providers, serially or in parallel.

Flow proceeds from S1150 to S1172 if the start date and the end date of the records identified at S1140 are not today and MAX. A first one of the identified records is acquired at S1172, with start date S and end date E. At S1174, it is determined whether the start date of the current feed is less than or equal to S. If so, the record represents data valid in the future, and flow proceeds to S1176, where the feed end date is compared to E. The record is deleted at S1178 if the feed end date is greater than or equal to E. If the feed end date is less than E, the start date of the record is changed to the feed start date plus one day at S1180.

Next, at S1182, it is determined whether any other records were identified at S1140. If so, flow returns to S1172 and continues as described above. If not, process 100 ends.

Returning to S1174, flow proceeds to S1184 if it is determined that the start date of the current feed is less than S. The feed end date is compared to E at S1184. If the feed end date is greater than or equal to E, the end date of the record is changed to the feed start date minus one day at S1186. If the feed end date is less than E, the record is split into two records at S1188. The start end and end date (e.g., (start date, end date)) of the records are (E, feed start date minus one day) and (feed end date plus one day, E), respectively.

Embodiments are not limited to the specific details of process 1100.

Figure 12:
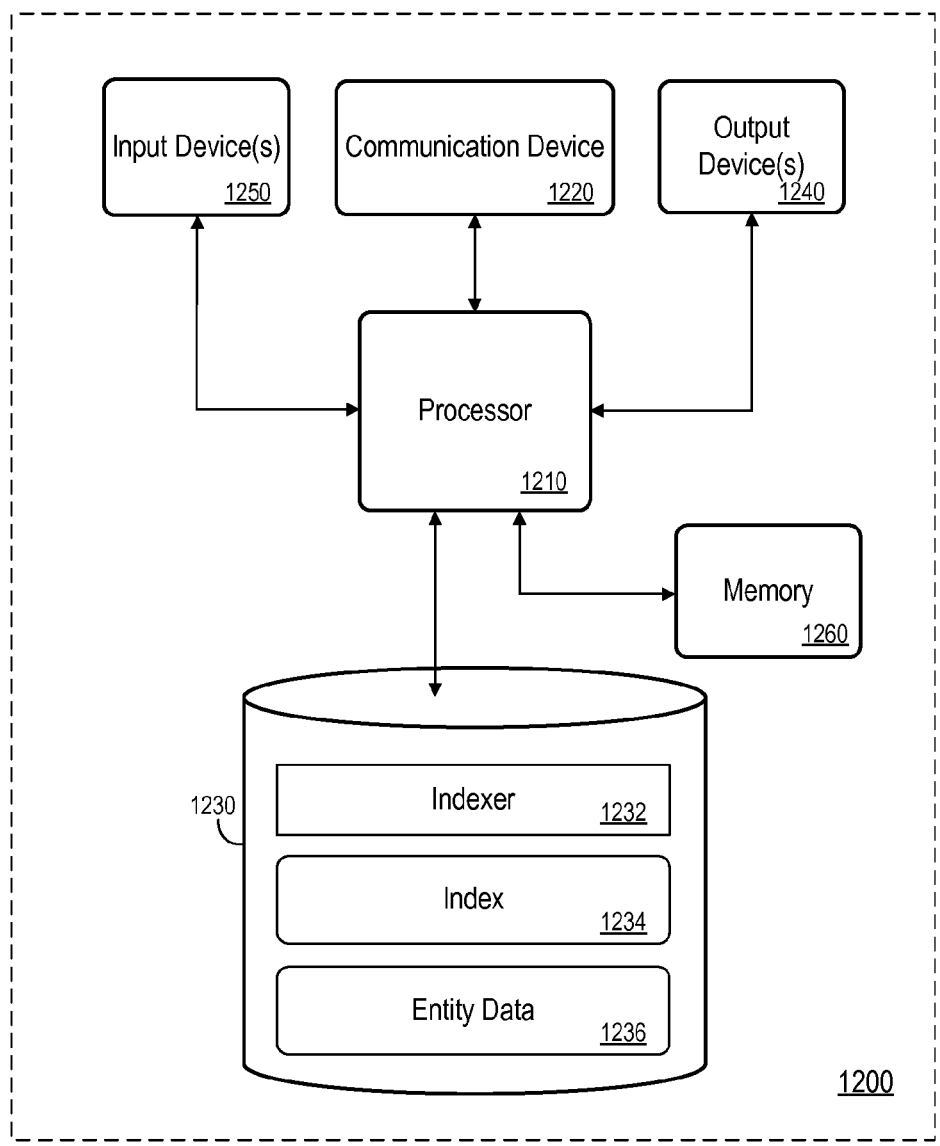
FIG. 12 is a block diagram of an apparatus according to some embodiments.

FIG. 12 is a block diagram of apparatus 1200 according to some embodiments. Apparatus 1200 may comprise a generalpurpose computing apparatus and may execute program code to perform any of the functions described herein. Apparatus 1200 may comprise an implementation of elements of environments 100 and/or 500. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260. Communication device 1220 may facilitate communication with external devices, such as an external design tool. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Text analysis engine 1232 of data storage device 1230 may be executable by processor 1210 to provide functions described herein, including but not limited to processes 300, 400, 600 and 1000. Embodiments are not limited to execution of these functions by a single apparatus. Entity-relation store 1234 may include a plurality of entities, with each of the plurality of entities being associated with a respective name and a respective one or more attributes. Each of the plurality of entities is associated with one or more relations to one or more other ones of the plurality of entities.

Data storage device 1230 may also store data and other program code for providing additional functionality and/or which are necessary for operation thereof, such as device drivers, operating system files, etc.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
   determining a first data structure associated with an entity and a second data structure associated with the entity, the first data structure associated with a first validity period and the second data structure associated with a second validity period, the first validity period different from the second validity period, and the first validity period and the second validity period sharing a common third period;
   determining a plurality of non-overlapping time periods based on the first validity period and the second validity period, the plurality of non-overlapping time periods comprising a first non-overlapping time period from a beginning of the first validity period to a beginning of the common third period, a second non-overlapping time period equal to the common third period, and a third non-overlapping time period from an end of the common third period to an end of the second validity period;
   determining a first composite data structure associated with the first non-overlapping time period based on the first data structure;
   determining a second composite data structure associated with the second non-overlapping time period based on the first data structure and on the second data structure;
   determining a third composite data structure associated with the third non-overlapping time period based on the second data structure;
   assigning a first document identifier to the first composite data structure, a second document identifier to the second composite data structure, and a third document identifier to the third composite data structure, each of the first, second and third document identifiers indicating the entity; and
   indexing the first, second and third composite data structures within an index,
   wherein the first composite data structure comprises a first start date and a first end date defining the first validity period, the second composite data structure comprises a second start date and a second end date defining the second validity period, and the third composite data structure comprises a third start date and a third end date defining the third validity period, and
   wherein indexing the first, second and third composite data structures comprises indexing the first start date, the first end date, the second start date, the second end date, the third start date and the third end date.

2. A method according to claim 1, further comprising:
   determining a third data structure associated with a second entity and a fourth data structure associated with the second entity, the third data structure associated with a third validity period and the fourth data structure associated with a fourth validity period, the third validity period different from the fourth validity period, and the third validity period and the fourth validity period sharing a common fifth period;
   determining a second plurality of non-overlapping time periods based on the third validity period and the fourth validity period, the second plurality of non-overlapping time periods comprising a fourth non-overlapping time period from a beginning of the third validity period to a beginning of the common fifth period, a fifth non-overlapping time period equal to the common fifth period, and a sixth non-overlapping time period from an end of the common fifth period to an end of the fourth validity period;
   determining a fourth composite data structure associated with the fourth non-overlapping time period based on the third data structure;
   determining a fifth composite data structure associated with the fifth non-overlapping time period based on the third data structure and on the fourth data structure;
   determining a sixth composite data structure associated with the sixth non-overlapping time period based on the fourth data structure; and
   assigning a fourth document identifier to the fourth composite data structure, a fifth document identifier to the fifth composite data structure, and a sixth document identifier to the sixth composite data structure, each of the fourth, fifth and sixth document identifiers indicating the second entity,
   wherein indexing the first, second and third composite data structures comprises indexing the fourth, fifth and sixth composite data structures within the index.

3. A method according to claim 1, further comprising:
   receiving a search query;
   identifying at least one document identifier from the index based on the search query;

determining at least one entity corresponding to the at least one document identifiers; and generating a search result indicating the at least one entity.

4. A method according to claim 3, wherein each composite data structure comprises a start date and an end date defining the validity period of the composite data structure, wherein indexing the composite data structures comprises indexing the start date and the end date of each composite data structure, wherein the search query comprises a search start date and a search end date.

5. A method according to claim 4, wherein a plurality of the at least one identified document identifiers correspond to a first entity, the method further comprising:

determining a relevance score for the first entity based on relevance scores associated with the plurality of the identified at least one document identifiers.

6. A non-transitory medium storing processor-executable program code, the program code executable by a device to:

determine a first data structure associated with an entity and a second data structure associated with the entity, the first data structure associated with a first validity period and the second data structure associated with a second validity period, the first validity period different from the second validity period, and the first validity period and the second validity period sharing a common third period;

determine a plurality of non-overlapping time periods based on the first validity period and the second validity period, the plurality of non-overlapping time periods comprising a first non-overlapping time period from a beginning of the first validity period to a beginning of the common third period, a second non-overlapping time period equal to the common third period, and a third non-overlapping time period from an end of the common third period to an end of the second validity period;

determine a first composite data structure associated with the first non-overlapping time period based on the first data structure;

determine a second composite data structure associated with the second non-overlapping time period based on the first data structure and on the second data structure;

determine a third composite data structure associated with the third non-overlapping time period based on the second data structure;

assign a first document identifier to the first composite data structure, a second document identifier to the second composite data structure, and a third document identifier to the third composite data structure, each of the first, second and third document identifiers indicating the entity; and index the first, second and third composite data structures within an index, wherein the first composite data structure comprises a first start date and a first end date defining the first validity period, the second composite data structure comprises a second start date and a second end date defining the second validity period, and the third composite data structure comprises a third start date and a third end date defining the third validity period, and wherein indexing of the first, second and third composite data structures comprises indexing of the first start date, the first end date, the second start date, the second end date, the third start date and the third end date.

7. A non-transitory medium according to claim 6, the program code further executable by the device to:

determine a third data structure associated with a second entity and a fourth data structure associated with the second entity, the third data structure associated with a third validity period and the fourth data structure associated with a fourth validity period, the third validity period different from the fourth validity period, and the third validity period and the fourth validity period sharing a common fifth period;

determine a second plurality of non-overlapping time periods based on the third validity period and the fourth validity period, the second plurality of non-overlapping time periods comprising a fourth non-overlapping time period from a beginning of the third validity period to a beginning of the common fifth period, a fifth non-overlapping time period equal to the common fifth period, and a sixth non-overlapping time period from an end of the common fifth period to an end of the second validity periods;

determine a fourth composite data structure associated with the fourth non-overlapping time period based on the third data structure;

determine a fifth composite data structure associated with the fifth non-overlapping time period based on the third data structure and on the fourth data structure;

determine a sixth composite data structure associated with the sixth non-overlapping time period based on the fourth data structure; and assign a fourth document identifier to the fourth composite data structure, a fifth document identifier to the fifth composite data structure, and a sixth document identifier to the sixth composite data structure, each of the fourth, fifth and sixth document identifiers indicating the second entity, wherein indexing of the first, second and third composite records comprises indexing of the fourth, fifth and sixth composite data structures within the index.

8. A non-transitory medium according to claim 6, the program code further executable by the device to:

receive a search query;

identify at least one document identifier from the index based on the search query;

determine at least one entity corresponding to the at least one document identifiers; and generate a search result indicating the at least one entity.

9. A non-transitory medium according to claim 8, wherein each composite data structure comprises a start date and an end date defining the validity period of the composite data structure, wherein indexing of the composite data structures comprises indexing of the start date and the end date of each composite data structure, wherein the search query comprises a search start date and a search end date.

10. A non-transitory medium according to claim 9, wherein a plurality of the at least one identified document identifiers correspond to a first entity, the program code further executable by the device to:

determine a relevance score for the first entity based on relevance scores associated with the plurality of the identified at least one document identifiers.

11. A system comprising:

a computing device comprising:

a memory system storing processor-executable program code; and a processor to execute the processor-executable program code in order to cause the computing device to:

determine first data structure associated with an entity and a second data structure associated with the entity, the first data structure associated with a first validity period and the second data structure associated with a second validity period, the first validity period different from the second validity period, and the first validity period and the second validity period sharing a common third period;

determine a plurality of non-overlapping time periods based on the first validity period and the second validity period, the plurality of non-overlapping time periods comprising a first non-overlapping time period from a beginning of the first validity period to a beginning of the common third period, a second non-overlapping time period equal to the common third period, and a third non-overlapping time period from an end of the common third period to an end of the second validity period;

determine a first composite data structure associated with the first non-overlapping time period based on the first data structure;

determine a second composite data structure associated with the second non-overlapping time period based on the first data structure and on the second data structure;

determine a third composite data structure associated with the third non-overlapping time period based on the second data structure;

assign a first document identifier to the first composite data structure, a second document identifier to the second composite data structure, and a third document identifier to the third composite data structure, each of the first, second and third document identifiers indicating the entity; and index the first, second and third composite data structures within an index, wherein the first composite data structure comprises a first start date and a first end date defining the first validity period, the second composite data structure comprises a second start date and a second end date defining the second validity period, and the third composite data structure comprises a third start date and a third end date defining the third validity period, and wherein indexing of the first, second and third composite data structures comprises indexing of the first start date, the first end date, the second start date, the second end date, the third start date and the third end date.

12. A system according to claim 11, the processor further to execute the processor-executable program code in order to cause the computing device to:

determine a third data structure associated with a second entity and a fourth data structure associated with the entity, the third data structure associated with a third validity period and the fourth data structure associated with a fourth validity period, the third validity period different from the fourth validity period, and the third validity period and the fourth validity period sharing a common fifth period;

determine a second plurality of non-overlapping time periods based on the third validity period and the fourth validity period, the second plurality of non-overlapping time periods comprising a fourth non-overlapping time period from a beginning of the third validity period to a beginning of the common fifth period, a fifth non-overlapping time period equal to the common fifth period, and a sixth non-overlapping time period from an end of the common fifth period to an end of the fourth validity periods;

determine a fourth composite data structure associated with the fourth non-overlapping time period based on the third data structure;

determine a fifth composite data structure associated with the fifth non-overlapping time period based on the third data structure and on the fourth data structure;

determine a sixth composite data structure associated with the sixth non-overlapping time period based on the fourth data structure; and assign a fourth document identifier to the fourth composite data structure, a fifth document identifier to the fifth composite data structure, and a sixth document identifier to the sixth composite data structure, each of the fourth, fifth and sixth document identifiers indicating the second entity, wherein indexing of the first, second and third composite data structures comprises indexing of the fourth, fifth and sixth composite record data structures within the index.

13. A system according to claim 11, the processor further to execute the processor-executable program code in order to cause the computing device to:

receive a search query;

identify at least one document identifier from the index based on the search query;

determine at least one entity corresponding to the at least one document identifiers; and generate a search result indicating the at least one entity.

14. A system according to claim 13, wherein each composite data structure comprises a start date and an end date defining the validity period of the composite data structure, wherein indexing of the composite data structures comprises indexing of the start date and the end date of each composite data structure, wherein the search query comprises a search start date and a search end date.

15. A system according to claim 14, wherein a plurality of the at least one identified document identifiers correspond to a first entity, the processor further to execute the processor-executable program code in order to cause the computing device to:

determine a relevance score for the first entity based on relevance scores associated with the plurality of the identified at least one document identifiers.

\* \* \* \* \*